United States Patent [19]
Schoderer et al.

[11] Patent Number: 5,374,081
[45] Date of Patent: Dec. 20, 1994

[54] MOTOR VEHICLE

[75] Inventors: Sigrid Schoderer, Koenigsbach-Stein; Hans-Juergen Woehler, Stuttgart, both of Germany

[73] Assignee: Dr. Ing. h.c.F. Porsche AG, Germany

[21] Appl. No.: 172,306

[22] Filed: Dec. 23, 1993

[30] Foreign Application Priority Data

Dec. 24, 1992 [DE] Germany .............. 4244216

[51] Int. Cl.⁵ .............................. B62D 7/22
[52] U.S. Cl. ..................... 280/788; 280/781
[58] Field of Search .......... 280/781, 788, 688, 793, 280/794

[56] References Cited

U.S. PATENT DOCUMENTS

| | | | |
|---|---|---|---|
| 1,948,744 | 2/1934 | Curtiss | 280/788 |
| 2,177,896 | 10/1939 | Lee | 280/781 |
| 2,997,313 | 8/1961 | Wall | 280/788 |
| 4,046,415 | 9/1977 | Klas et al. | 280/781 X |
| 4,426,101 | 1/1984 | Dyer | 280/788 X |
| 5,074,587 | 12/1991 | Schwab et al. | 280/781 |
| 5,280,957 | 1/1994 | Heutschel et al. | 280/788 |

FOREIGN PATENT DOCUMENTS

| | | |
|---|---|---|
| 0295661 | 12/1988 | European Pat. Off. ......... 280/781 |
| 0295662 | 12/1988 | European Pat. Off. . |
| 592840 | 2/1934 | Germany . |
| 1177016 | 5/1956 | Germany . |
| 4030921 | 4/1991 | Germany ......... 280/781 |

Primary Examiner—Mitchell J. Hill
Assistant Examiner—Christopher P. Ellis
Attorney, Agent, or Firm—Evenson, McKeown, Edwards & Lenahan

[57] ABSTRACT

A motor vehicle having exterior lateral side rails in the area of a passenger compartment has additional side rails which adjoin in the forward structure of the vehicle and/or in the rearward structure of the vehicle, which side rails are provided in particular with a right-angle bend. The elements which reinforce the vehicle body are connected with the side rails, on the one hand, and/or an underbody or underbody components, on the other hand. The reinforcing element has a first V-shaped strutting which extends in a horizontal plane in the longitudinal direction of the vehicle and is connected with a second-V-shaped strutting. This strutting is arranged in an approximately vertical transverse plane, in which case the first strutting, by its free ends, is fastened to the side rails and by its other ends, is fastened to the second strutting in a common connecting area. This second strutting is supported on the side rails by its free ends. The first V-shaped strutting has individual struts having abutting ends held in a U-shaped support part which extends in the longitudinal direction of the vehicle.

6 Claims, 1 Drawing Sheet

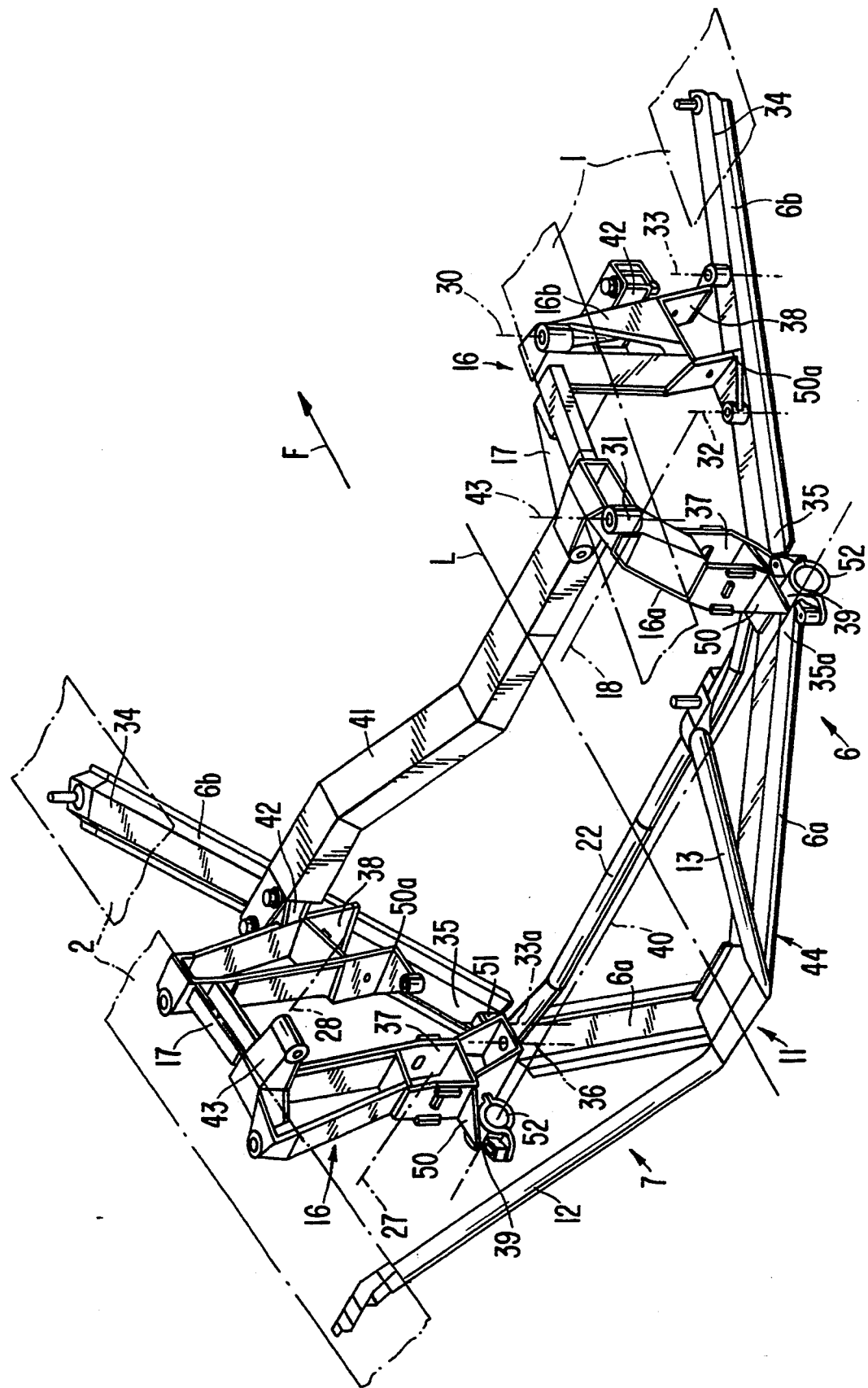

MOTOR VEHICLE

BACKGROUND AND SUMMARY OF THE INVENTION

The present invention relates to a motor vehicle having exterior lateral side rails in the area of a passenger compartment, which are adjoined by additional side rails in the forward structure of the vehicle and/or in the rearward structure of the vehicle. The said rails are provided in particular with a right-angle bend. Elements which reinforce the vehicle body are connected with the side rails, on the one side, and/or an underbody or underbody components on the other side. The reinforcing elements comprises a first V-shaped strutting which extends in a horizontal plane in the longitudinal direction of the vehicle and is connected with a second V-shaped strutting which is arranged in an approximately vertical transverse plane. The first strutting is fastened by means of its free ends to the side rails and is fastened to the second strutting by means of its ends which face away at a common connecting area. The second strutting is supported on the side rails by its free ends.

An arrangement of the above-described type is shown in German Application P 42 44 216.8 in which the individual struts, which extend in a horizontal plane and are arranged in a V-shape, are each of one piece construction. By means of one end, the individual struts are each connected to the side member of the vehicle body and, by means of their other end, they are connected with the other individual struts which are arranged in a vertical plane and also in a V-shape. For the accommodation and support of link bearings, a lateral support part is used which is provided between the individual struts and the vehicle body or the side rails of the body and which itself forms an opening for the guiding-through of a drive shaft. The horizontally arranged individual struts are arranged with this support part in such a manner that a high-strength connection to the vehicle body can be established.

An object of the present invention is to provide a motor vehicle having struts which reinforce the vehicle body, are easy to mount, simplify the installation and removal of the drive shaft and ensure an accommodation of links of a wheel suspension which is precise in its position, also when forces act upon the wheel.

This and other objects are achieved by the present invention which provides a motor vehicle comprising exterior lateral side rails in a passenger compartment area, additional side rails in at least one of the forward structure and in the rearward structure of the vehicle, the additional side rails adjoining the lateral side rails and having a right-angle bend. At least one vehicle body reinforcement element is connected between the side rails and an underbody, the reinforcing element having a first V-shaped strutting which extends in a horizontal plane in a longitudinal direction of the vehicle, and a second V-shaped strutting which is arranged in an approximately vertical transverse plane. The first strutting is connected to the second strutting, the first strutting having first free ends fastened to the side rails and second ends fastened to the second strutting at a common area, the second strutting having free ends supported at the side rails. U-shaped support parts are coupled to the side rails and extend in the longitudinal direction of the vehicle. The first strutting has at least two individual struts, and the individual struts have abutting ends held in the U-shaped support.

Some of the advantages of the present invention are that the lateral support parts are connected with the side rails of the vehicle body such that, after a section of an individual strut is removed, the propeller shaft can be installed or removed. Furthermore, because of the smaller overall length, a fastening of individual struts is simpler than that of a one-piece strut.

The individual struts are arranged at an obtuse angle with respect to one another which is required because of the common fastening point between the horizontally and the vertically arranged individual struts.

In particular, the one horizontally arranged individual strut, which, with respect to the driving direction, is situated in front, is connected via two fastenings with one column-type leg and via another end-face fastening with the other column-type leg of the support part. As a result, a torsion-resistant support part is formed which ensures a precise positioning of the suspension links in bearings of the column-type legs of the support part, in which case forces acting upon the wheel can cause no change of the position or a torsion of the support part.

Furthermore, the horizontal individual strut, which, with respect to the driving direction, is situated in the rear, is connected on the foot of the column-type leg together with a cross member via a single screw, the free ends of the individual struts being connected with the vertical individual struts, and thus a support is ensured between the side rails.

The lateral support parts are constructed, for example, as cast parts and, in addition to the integrated bearing receiving devices for the wheel suspension links, also each have a receiving device for a transmission bearing as well as a receiving device for a stabilizer suspension. Molded-on devices are also provided for the fastening of another cross member.

The horizontal individual struts consist, for example, of a U-profile, which is open in its cross-section, or of a hat-shaped profile. In contrast, the vertical individual struts comprise a tube or a profiled strut.

Other objects, advantages and novel features of the present invention will become apparent from the following detailed description of the invention when considered in conjunction with the accompanying drawings.

BRIEF DESCRIPTION OF THE DRAWING

An embodiment of the present invention is illustrated in the single drawing figure, FIG. 1.

DETAILED DESCRIPTION OF THE DRAWING

The drawing figure is a diagrammatic representation of the two support parts, which are connected with one another via cross members and have fastened horizontal and vertical individual struts.

On the one hand, a wheel suspension comprising several links 27, 28 is disposed on a supporting frame for a rear axle of a motor vehicle, and, on the other hand, a reinforcement is achieved of the vehicle body. The supporting frame comprises essentially in each case two lateral support parts 16 which are connected with side rails 1, 2 of the vehicle body and to which, in the area of the underbody, a first strutting 6 is fastened which is arranged in a V-shape. This first V-shaped strutting 6 extends in an approximately horizontal plane in the longitudinal direction of the vehicle. The second V-shaped strutting 7 is arranged in an approximately vertical plane. The first strutting 6 comprises individual struts 6a, 6b and the second strutting 7 comprises individual struts 12, 13 which are constructed as profiles, rods, tubes or similar devices. In the area 11 where they meet, the individual struts 6a, 6b are connected with one another. The strutting 6 with the individual struts 6a and 6b are combined to form a high strength connection, in which case the strutting 7 is also combined of individual struts 12, 13 but may consist of a continuous element. The individual struts 6a, 6b are arranged to be diverging in the driving direction and symmetrically with respect to the longitudinal centerplane L of the vehicle.

The support part 16 is constructed in a U-shape with spaced column-type legs 16a and 16b which are connected with one another to form a component via a web 17. This component is directed toward the side rail 1, 2 and is connected to this side rail 1, 2 by means of two screws 30, 31, which are illustrated symbolically as centerlines.

The column-type legs 16a and 16b are constructed in a profiled manner and are provided at the foot 50, 50a with receiving devices for connecting screws 32, 33 and 33a. Via screws 32, 33, the individual strut 6b of the strutting 6 is fastened with the foot 50a of the leg 16b of the carrier part 16.

A free end of the individual strut 6b, which projects toward the front, is connected with the side rail 1, the other rearwardly projecting end 35 being held in a receiving device 51 via the connecting screw 33a on the leg 16a of the support part 16.

The directly connecting individual strut 6a of the strutting 6 is connected by means of its end 35a with the leg 16a by a screw 36, by which a cross member 22 can be fastened at the same time. In the area 11 in which the strut 6a meet in a V-shape, they are connected with struts 12, 13 so that a high-strength connection is provided. The struts 12, 13 may, for example, also comprise a continuous one-piece tube, of a rod, of a profile or the like.

In addition to receiving devices 37, 38 for bearings of suspension arms 27, 28, in certain embodiments a holding device 39 for a transversely extending stabilizer 40 is also molded on in the carrier part 16. This stabilizer 40 is held by a clip 52 which can be screwed on.

For connecting the support part 16 with another cross member 41, one column-shaped leg 16b is provided with a projection 42 for a support and a fastening. Furthermore, in the plane of the web 17, a receiving device 43 for a transmission bearing is molded on which extends toward the interior.

In the area of the leg 16a, the individual struts 6a and 6b of the horizontal strutting 6 are arranged at an obtuse angle with respect to one another so that the ends 44 of the individual struts 6a can be guided to the connection area 11. The supporting frame can be premounted as a whole with the suspension arms 27, 28 and is to be mounted on the vehicle body as a unit. The connection of the individual struts 6b with the two legs 16a and 16b of the support part 16 has a reinforcing effect on this part so that, also when forces, such as side forces, act upon the wheel, these parts can be supported, without the occurrence of a torsion of the support part 16 or of the vehicle body.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A motor vehicle subframe comprising:

exterior lateral side rails in a passenger compartment area;

additional side rails in at least one of the forward structure and in the rearward structure of the vehicle, the additional side rails adjoining the lateral side rails, at least one vehicle body reinforcement element connected between the side rails and an underbody, the reinforcing element having a first V-shaped strutting which extends in a horizontal plane in a longitudinal direction of the vehicle, and a second V-shaped strutting which is arranged in an approximately vertical transverse plane, the first strutting being connected to the second strutting, the first strutting having first free ends fastened to the additional side rails and second ends fastened to the second strutting at a common area, the second strutting having free ends supported at the lateral side rails; and U-shaped support parts coupled to the lateral side rails and extending in the longitudinal direction of the vehicle;

wherein the first strutting has at least two individual struts, the individual struts having abutting ends held in the U-shaped support.

2. A motor vehicle subframe according to claim 1, wherein the support part has two column-type legs which are directed toward the individual struts and a web, which connects the two legs with one another, is supported on the side rail and is connected with the side rail by fastening devices.

3. A motor vehicle subframe according to claim 2, wherein one of the individual struts and a transverse strut are connected via a fastening screw with a foot of one of said legs located towards the rear with respect to a driving direction, and the other one of the individual struts is fixed in a receiving device of said leg by another fastening screw.

4. A motor vehicle subframe according to claim 3, wherein a cross member is fastened to a lateral supporting bracket of the column-shaped leg situated in front with respect to the driving direction.

5. A motor vehicle subframe according to claim 2, wherein one transmission bearing respectively, which is arranged on an interior side of the web, is connected with the support part.

6. A motor vehicle subframe according to claim 3, wherein a receiving device for a stabilizer is arranged on the foot of the rearward leg, said stabilizer being held by a clip which is tightly screwable.

* * * * *